(No Model.)  2 Sheets—Sheet 1.
O. W. SMITH.
CHEESE CUTTER.
No. 441,985.  Patented Dec. 2, 1890.
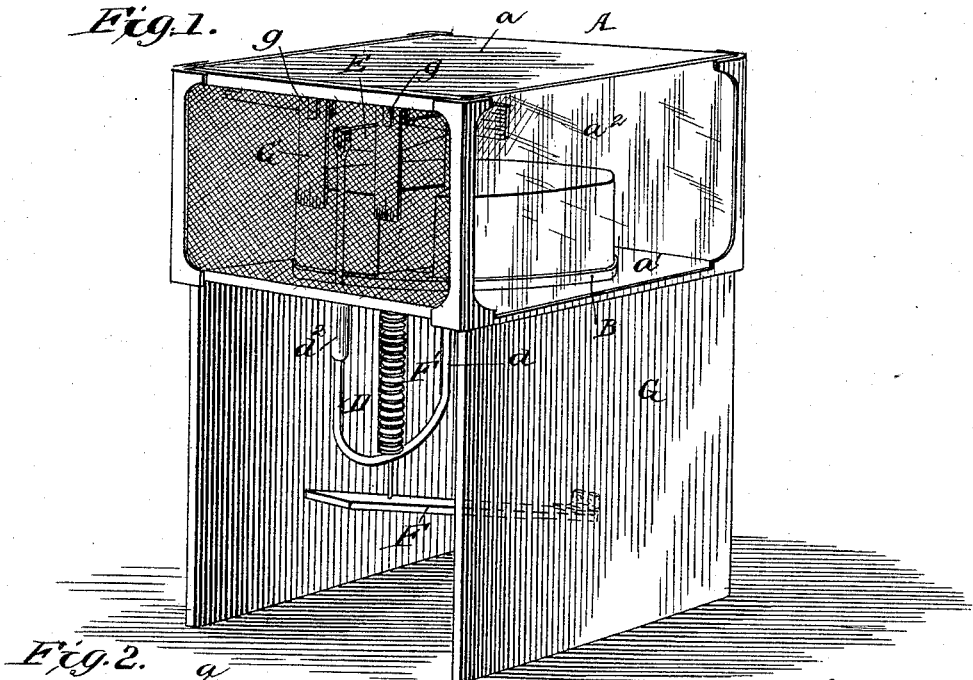
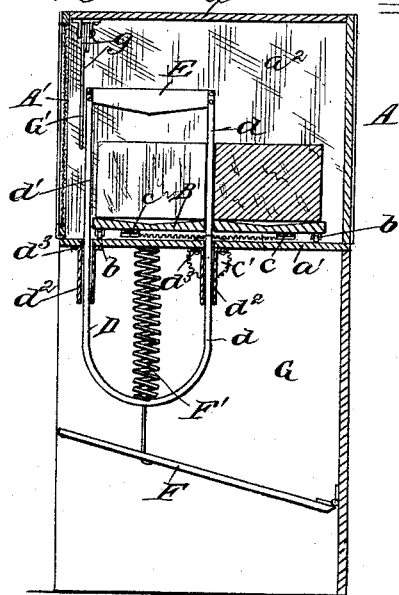
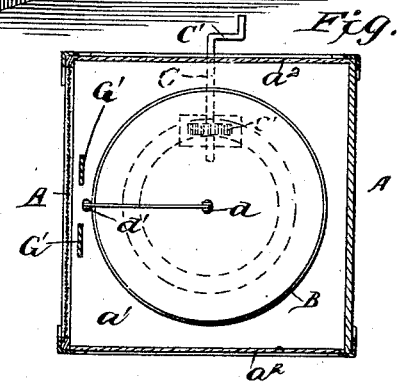
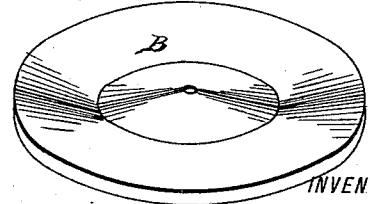
WITNESSES:
INVENTOR:
Orson W. Smith,
BY
J. R. Littell,
ATTORNEY (No Model.) 2 Sheets—Sheet 2.

O. W. SMITH.
CHEESE CUTTER.

No. 441,985. Patented Dec. 2, 1890.

WITNESSES:
Wm. J. Littell
J. van Allen Shields

INVENTOR:
Orson W. Smith
BY J. R. Littell
ATTORNEY

UNITED STATES PATENT OFFICE.

ORSON WHITE SMITH, OF CHARLEVOIX, MICHIGAN.

CHEESE-CUTTER.

SPECIFICATION forming part of Letters Patent No. 441,985, dated December 2, 1890.

Application filed January 2, 1890. Serial No. 335,666. (No model.)

*To all whom it may concern:*

Be it known that I, ORSON WHITE SMITH, a citizen of the United States, residing at Charlevoix, in the county of Charlevoix and State of Michigan, have invented certain new and useful Improvements in Cheese-Cutters, of which the following is a specification.

This invention relates to that class of cheese-cutters in which the knife is adapted to be operated by foot-power; and the object of the invention is to provide a device of this class in which the cheese is adapted to be revolved and cut with the casing closed, thus fully protecting the same from cheese-flies and other insects.

A further object of the invention is to provide a system of gages designed to facilitate the cutting of a piece of cheese of the desired weight.

A further object of the invention is to provide a cheese-cutter of this character possessing advantages in point of simplicity, inexpensiveness, durability, and general efficiency.

Figure 5:
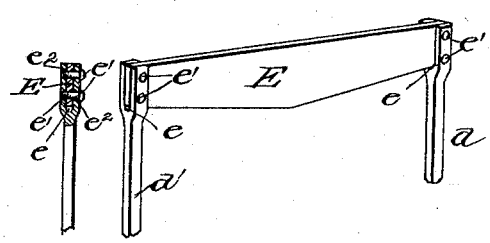
Figure 6:
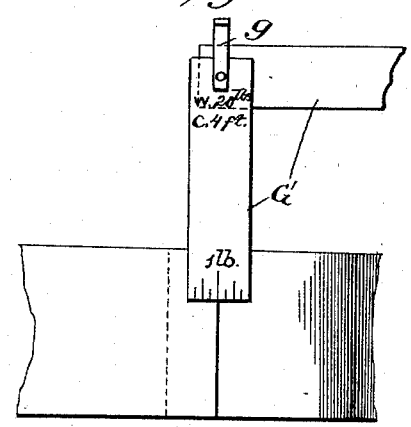
Figure 7:
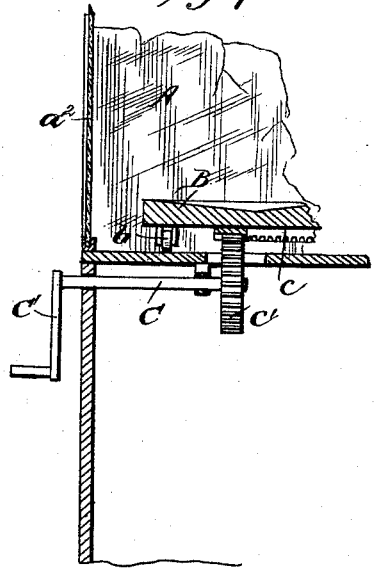
Figure 8:
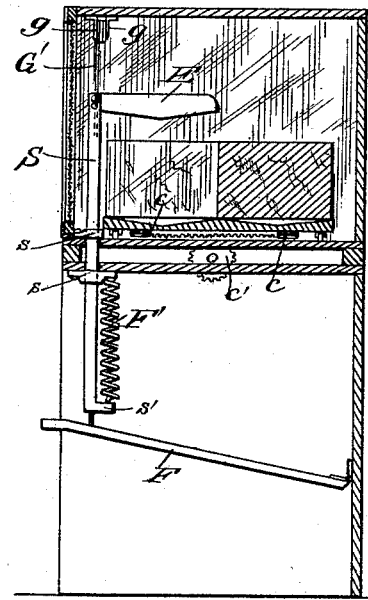

In the drawings, Figure 1 is a perspective view of a cheese-cutter embodying my invention. Fig. 2 is a vertical longitudinal sectional view. Fig. 3 is a top or plan view with the top of the casing removed. Fig. 4 is a detail perspective view of the cheese-board. Fig. 5 is a detail perspective of the knife, illustrating the manner of securing the same to the bars. Fig. 6 is an enlarged front elevation of the cheese and one of the gage-plates, and showing the operation of the latter. Fig. 7 is an enlarged detail sectional view illustrating the means for revolving the cheese-board. Fig. 8 is a vertical longitudinal sectional view of the cutter, illustrating a modification.

Corresponding parts in the figures are denoted by the same letters of reference.

Referring to the drawings, A designates a casing consisting of a top and bottom $a$ $a'$, respectively, and the sides $a^2$, the latter being preferably formed of glass. At the front of the casing is provided a sliding screen-door A', through which the cheese is inserted or removed. Upon the bottom $a'$ is mounted a rotatable cheese-board B, provided upon its under side with rollers $b$. To effect the rotation of this board, it is also provided upon its under side with a circumferential rack-plate $c$, adapted to mesh with a pinion $c'$, rigidly mounted on the inner end of a shaft C, the latter projecting through the casing at one side, and is provided at its outer end with a crank-handle C'. The top of the cheese-board is beveled from its center to about midway between the same and the periphery, and also from the latter inwardly, thus forming in cross-section a flat V-shaped groove at each side the center, the purpose of which will be hereinafter described.

D designates an approximately-U-shaped frame, projecting upwardly through the bottom of the casing, one of the arms $d$ passing through the center of the cheese-board and forming the fulcrum therefor. The other arm $d'$ projects up in front of the cheese-board and at the center of the front side of the casing. These arms are adapted to play in and be guided by tubes $d^2$ $d^2$, provided at their upper ends with flanges $d^3$ $d^3$, by which they are secured to the upper side of the bottom $a'$. The upper ends of the arms $d$ $d'$ are slotted, as shown at $e$, and within said slots are secured the ends of a removable knife E. The latter is retained in the slots by pins or screws $e'$, passing through transverse perforations $e^2$ in the ends of the arms and through perforations in the knife. The cutting-edge of the knife is formed V-shaped and corresponds with the groove in the board. By this construction the knife enters the cheese at an angle and renders the cutting of the cheese and the cloth covering more effective. The cutting of the cheese is further facilitated by grooving the cheese board as above described. In this construction the cheese rests upon the board only at the center thereof and at its periphery, thus permitting the knife to pass entirely through the cheese.

For operating the knife a foot-lever F is employed, hinged at one end and connected about centrally with the U-shaped frame. The operation will be obvious. To cut the cheese, the free end of the lever is pressed with the foot, drawing the frame down, carrying with it the knife, which enters and cuts the cheese as above described. A coil-spring F' is disposed between the bottom of the casing and the curved portion of the frame, and is designed to exert its tension to return the frame and knife to normal position. A supplementary casing G may be also employed, adapted to be disposed under and support the casing A and inclose the operating mechanism located outside the latter. This supplementary casing is not, however, essential to the invention, as the casing A may be placed upon a table or counter, in which case the top of the same serves as the bottom of the casing A.

To enable the cutting of a piece of cheese of a desired weight, I have provided a system of measures G'. The latter consists of two series of plates swung from the top of the casing and project down at each side of the knife, each series of plates being pivoted to arms $g$ $g$, projecting from the top of the casing, and by means of this double series of measures the cheese is adapted to be cut from either side, thus preventing drying of the same from long exposure. The plates of each series correspond, and each pair of plates has stamped or otherwise marked thereon at the top a certain weight and circumference of cheese, while at the lower edge is provided a scale corresponding thereto, the latter showing the amount necessary to cut for a given weight. For example, if the cheese is found to weigh twenty pounds and to be four feet in circumference, the plate of each series so marked or the one nearest approximating such measurement is swung down to a vertical position to remain until all the cheese is disposed of. The scale at the bottom of the plates is graduated to show the necessary width at the periphery of the cheese a piece of the latter must be to weigh a given amount. Thus to cut a piece of cheese of, say, one-pound weight, the knife is operated to cut a groove at one side of the cheese. The cheese is then turned in either direction until the groove registers with the one-pound mark on the respective plate, when the knife is again operated, cutting a piece the desired weight. (See Fig. 6.)

The operation and advantages of my invention will be readily understood by those skilled in the art to which it appertains. Before the cheese is placed in the cabinet the weight and circumference is first ascertained. A hole is then made through the center of the cheese, the knife removed from the arm $d$ of the frame D, and the cheese placed in position upon the board. The measuring-plates at each side, marked with a corresponding weight and circumference, are then exposed to view, when the cabinet is in readiness for use. To cut a piece of cheese of a given weight, the crank-handle is operated to turn the cheese in either direction until the latter coincides with the desired mark on the respective measuring-plate, when the foot-lever is pressed and the desired piece of cheese cut. The door is then opened and the cheese removed. It will thus be seen that the cabinet remains closed until the cheese is cut and ready for removal, protecting the cheese at all times from insects.

In Fig. 8 I have illustrated a modified method of operating the knife, in which a single flat bar S is employed in lieu of the two arms $d$ $d'$, said bar being vertically movable in suitable guides $s$ $s$ at the front of the cabinet. To the upper end of the bar S is rigidly secured the knife E, the latter projecting inwardly over the cheese-board and at right angles to said bar. The bar S is provided at its lower end with an inwardly-extending arm $s'$ at right angles thereto, and between said arm and the bottom of the casing is disposed the coil-spring F', the office of which being hereinbefore described. To the lower end of the bar S is connected the lever F, by which the former is operated. It will be obvious that by the employment of this form of knife-operating mechanism the necessity of first cutting a hole centrally through the cheese for the passage of a second bar or arm is entirely obviated.

I claim as my invention—

1. The combination, with a rotatable cheese-board, of an approximately-U-shaped spring-held frame formed in one piece, the arms of which pass up through guides therefor, one of said arms forming a pivot for the cheese-board, a knife removably secured to the upper ends of said arms and provided with a V-shaped cutting-edge, and a foot-lever for operating the knife, substantially as set forth.

2. The combination, with a cheese-cutter comprising a rotatable cheese-board and a vertically-adjustable knife, of gage-plates suspended at each side of the latter and marked with a given weight and circumference of cheese and with a weight-scale, said plates being pivoted at their upper ends, whereby they are adapted to be swung up to a horizontal position and out of use, substantially as and for the purpose set forth.

In testimony whereof I affix my signature in presence of two witnesses.

ORSON WHITE SMITH.

Witnesses:
J. J. HALLETT,
GEO. SHERWOOD.